(12) United States Patent
Yanagihara et al.

(10) Patent No.: US 12,496,642 B2
(45) Date of Patent: Dec. 16, 2025

(54) TOOL BRACKET, DEBURRING TOOL WITH TOOL BRACKET, AND DEBURRING METHOD

(71) Applicant: SUGINO MACHINE LIMITED, Namerikawa (JP)

(72) Inventors: Yusuke Yanagihara, Namerikawa (JP); Akihiro Ishitani, Namerikawa (JP); Mitsuru Muto, Namerikawa (JP)

(73) Assignee: SUGINO MACHINE LIMITED, Toyama Prefecture (JP)

( * ) Notice: Subject to any disclaimer, the term of this patent is extended or adjusted under 35 U.S.C. 154(b) by 0 days.

(21) Appl. No.: 18/759,758

(22) Filed: Jun. 28, 2024

(65) Prior Publication Data

US 2025/0025946 A1    Jan. 23, 2025

(30) Foreign Application Priority Data

Jul. 20, 2023 (JP) .................. 2023-118060

(51) Int. Cl.
  *B23B 31/02*   (2006.01)
  *B23B 51/10*   (2006.01)
  *B23C 3/12*    (2006.01)

(52) U.S. Cl.
  CPC .............. *B23C 3/12* (2013.01); *B23B 51/101* (2013.01); *B23C 3/126* (2013.01); *B23B 2220/08* (2013.01)

(58) Field of Classification Search
  CPC ... B23B 31/08; B23B 2220/08; B23B 51/101; B23Q 3/12; Y10T 279/17017; Y10T 408/665; Y10T 409/309408
  See application file for complete search history.

(56) References Cited

U.S. PATENT DOCUMENTS 1,782,633 A  * 11/1930 Schiltz ................... B23B 31/08
                                                        408/127
3,359,008 A  * 12/1967 Stimmerman ......... B23B 31/08
                                                        408/127
(Continued)

FOREIGN PATENT DOCUMENTS

CN      106217246 A  * 12/2016  ............. B24B 49/10
DE      102013111941 A  *  4/2015
(Continued)

OTHER PUBLICATIONS

Extended European Search Report mailed on Jan. 2, 2025 in a corresponding European Patent Application No. 24183107.2 (8 pages).

*Primary Examiner* — Nicole N Ramos
(74) *Attorney, Agent, or Firm* — United IP Counselors, LLC

(57) ABSTRACT

Provided is a tool bracket capable of tilting a spindle body even when a moment load acting on the spindle body is relatively small. A tool bracket includes: a housing including a cylinder chamber extending along a cylinder axis; a piston urged by compressible fluid toward distal end to reciprocate in the cylinder chamber and having an action portion disposed at distal end; and a tilting body having a tilt axis and disposed in the cylinder chamber in a tiltable manner with respect to the cylinder axis, and includes a centering portion disposed at basal end to abut the action portion, the centering portion presses the piston with the cylinder axis as an action line when the tilt axis is tilted from the cylinder axis.

18 Claims, 12 Drawing Sheets

(56) References Cited

U.S. PATENT DOCUMENTS

| | | | | |
|---|---|---|---|---|
| 4,332,066 A | * | 6/1982 | Hailey | B23Q 35/02 |
| | | | | 901/41 |
| 4,439,075 A | | 3/1984 | Wiederkehr | |
| 4,984,942 A | * | 1/1991 | Holtz | B23B 31/08 |
| | | | | 408/127 |
| 6,352,394 B1 | | 3/2002 | Lawson et al. | |
| 7,726,919 B1 | * | 6/2010 | Rottler | B23C 3/056 |
| | | | | 408/127 |
| 2013/0192059 A1 | * | 8/2013 | Steger | B23C 3/12 |
| | | | | 29/650 |

FOREIGN PATENT DOCUMENTS

| | | |
|---|---|---|
| JP | H07-223158 A | 8/1995 |
| JP | 2016-007691 A | 1/2016 |
| JP | 2020-066120 A | 4/2020 |
| KR | 102147044 B1 | 8/2020 |

* cited by examiner

TOOL BRACKET, DEBURRING TOOL WITH TOOL BRACKET, AND DEBURRING METHOD

CROSS-REFERENCE TO RELATED APPLICATIONS

This application claims the benefit of priority to Japanese Patent Application No. 2023-118060, filed on Jul. 20, 2023, the entire contents of which are hereby incorporated by reference.

BACKGROUND

1. Technical Field

The present invention relates to a tool bracket, a deburring tool with the tool bracket, and a deburring method.

2. Description of the Background

A deburring tool attached to a robot or the like is known (for example, JP2020-66120 A1; hereinafter, Patent Literature 1). The deburring tool of Patent Literature 1 includes a cylindrical housing, a spindle body having a center disk and being tiltable and loosely fitted and supported in the housing, a piston that presses the center disk toward the distal end, a spring that urges the piston toward the distal end, a separation ring that is disposed between the piston and the spring, and a channel that supplies air between the separation ring and the piston.

BRIEF SUMMARY

In the deburring tool of Patent Literature 1, when the spindle body is tilted, a moment load acts on the piston, and the piston may be difficult to move. It is thus difficult to reduce the load required for the spindle body to tilt.

An object of the present invention is to provide a tool bracket and a deburring tool with the tool bracket, in which the spindle body can be tilted even when a moment load acting on the spindle body is relatively small.

A first aspect of the present invention provides a tool bracket, including:
 a housing including a cylinder chamber extending along a cylinder axis;
 a piston configured to be urged by compressible fluid toward distal end to reciprocate in the cylinder chamber, the piston having an action portion disposed at distal end; and
 a tilting body having a tilt axis, the tilting body disposed in the cylinder chamber in a tiltable manner with respect to the cylinder axis, the tilting body including a centering portion disposed at basal end to abut the action portion, the centering portion configured to press the piston with the cylinder axis as an action line when the tilt axis is tilted from the cylinder axis.

A second aspect of the present invention provides a deburring tool, including:
 the tool bracket, and
 a spindle body to which a rotatable tip tool is attachable, the spindle body disposed on the tilting body to be tilted integrally with the tilting body.

A third aspect of the present invention provides a deburring method, including:
 pressing a tilting body toward distal end via a piston by compressible fluid;
 when a tip tool contacts a workpiece to receive moment load, tilting the tilting body about a point where a head surface disposed at distal end portion of the tilting body contacts a seat surface disposed at distal end portion of a housing;
 pressing the piston against pressure of the compressible fluid by the tilting body with a cylinder axis as an action line; and
 deburring the workpiece by the tip tool integrally with the tilting body with tilting along a shape of the workpiece.

The piston urges the tilting body toward distal end by fluid pressure.

The cylinder chamber may include a cylinder portion and a guide portion. The cylinder portion, which is connected to the fluid-port, is disposed at the distal end portion. The guide portion is disposed at the basal end portion.

The piston may include a head portion and a sleeve. The head portion slides with the cylinder portion. The sleeve is guided by the guide.

The contact protrusion is, for example, a ball or a pin. The contact protrusion may have a convex spherical surface that abuts the action portion.

The rotation stopper includes a rotation stopper body and a receiving portion. The rotation stopper body may be, for example, a ball or a pin. The rotation stopper body is disposed on either the housing or the tilting body. The receiving portion is arranged on the other of the housing or the tilting body. The rotation stopper body or the receiving groove disposed on the tilting body tilt integrally with the tilting body. A gap is provided between the rotation stopper body and the receiving groove. Preferably, a plurality of rotation stoppers are arranged. Either the rotation stopper bodies or the receiving grooves, which are arranged in the housing, are arranged rotationally symmetrically about the cylinder axis. The other of the rotation stopper bodies or the receiving grooves, which are arranged on the tilting body, are arranged rotationally symmetrically about the tilting axis.

The rotation stopper may have a bulging portion. The bulging portion may include a transmission sphere.

The bulging portion arranged on the tilting body may be arranged on a plane passing through the tilt center and perpendicular to the tilting axis. The bulging portion arranged in the housing may be arranged in a plane perpendicular to the cylinder axis, passing through the tilt center in a state in which the tilting body does not tilt.

The receiving groove disposed in the housing may extend along the cylinder axis.

When the moment load applied to the spindle body is small, the head surface abuts against the seat surface, and the tilt axis and the cylinder axis substantially coincide with each other.

According to the tool bracket and the deburring tool of the present invention, the spindle body can be tilted even when the moment load acting on the spindle is relatively small.

DETAILED DESCRIPTION

First Embodiment

Figure 1:
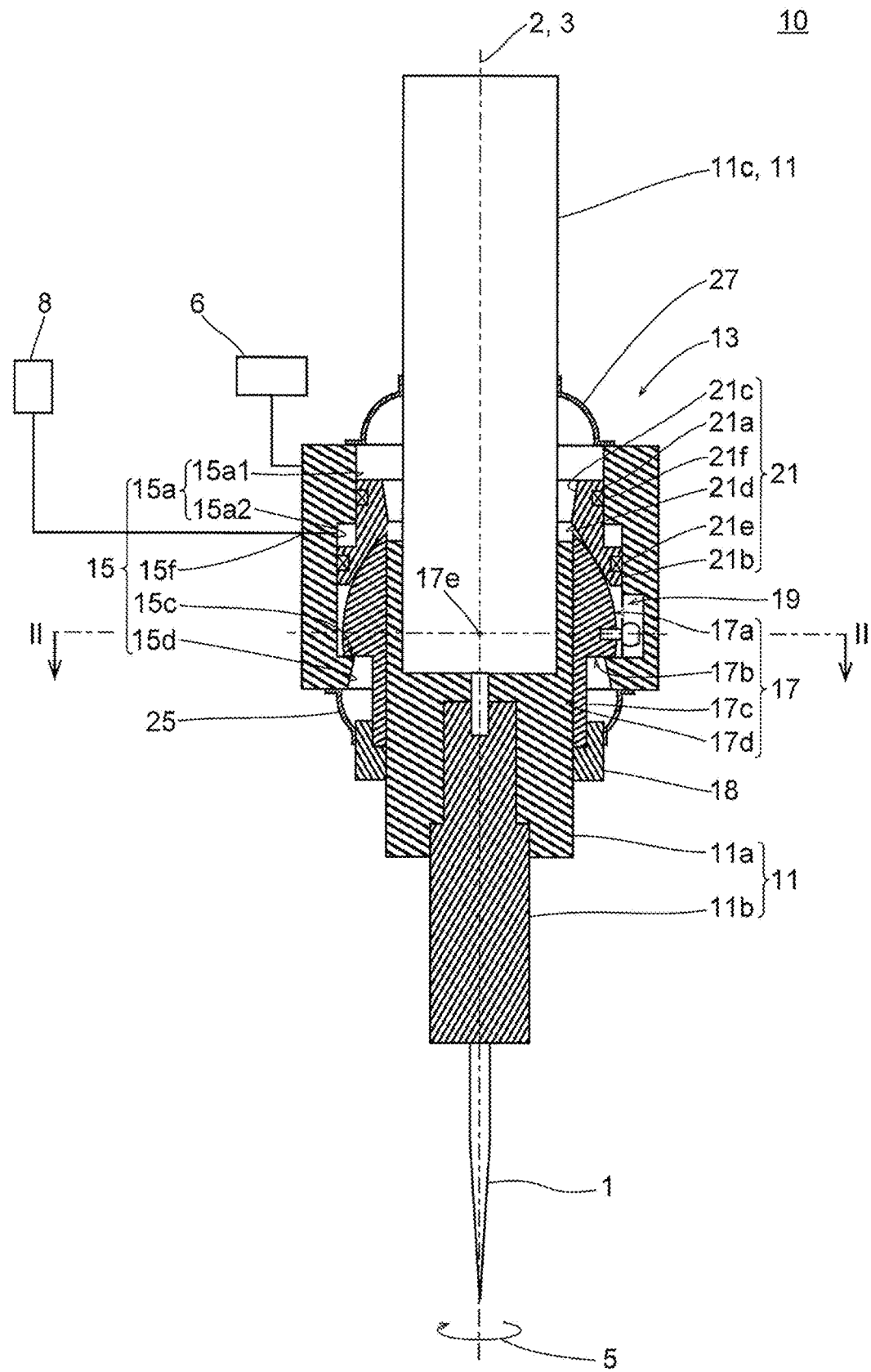
FIG. 1 is a longitudinal sectional view of a deburring tool according to a first embodiment in a non-tilted state.

As shown in FIG. 1, a deburring tool 10 according to the present embodiment includes a tool bracket 13 and a spindle body 11. FIG. 1 is a sectional view taken along line I-I in FIG. 2. FIG. 1 shows a state in which the spindle body 11 is not tilted. In FIG. 1, a cylinder axis 2 (see FIG. 4) and a tilt axis 3 (see FIG. 4) coincide with each other.

The deburring tool 10 is connected to a robot 6 and an air source 8.

The tool bracket 13 includes a housing 15, a piston 21, a tilting body 17, a coupling 18, a rotation stopper 19, a basal end cover 27, and a distal end cover 25.

The housing 15 has a hollow shape. The piston 21, the tilting body 17, and the rotation stopper 19 are disposed inside the housing 15 from the basal end.

Figure 2:
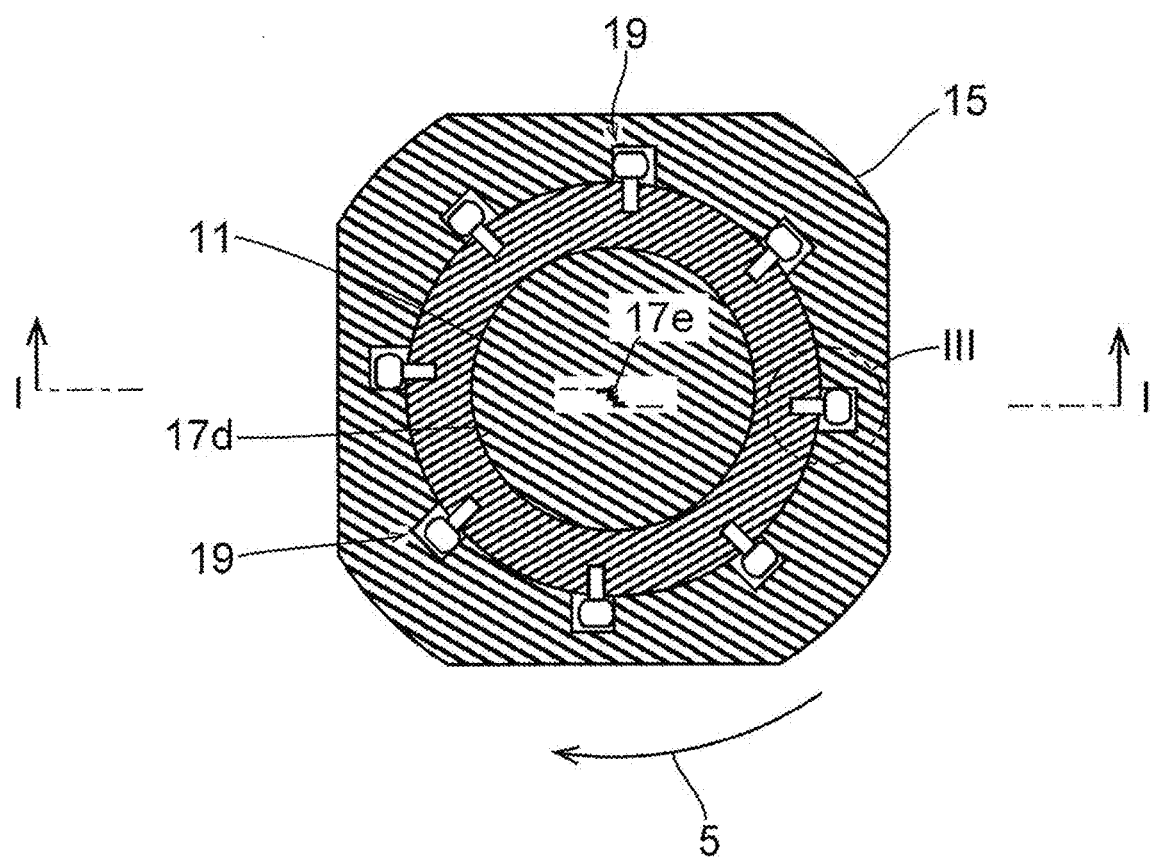
FIG. 2 is a cross-sectional view taken along line II-II in FIG. 1.

The housing 15 has a cylinder chamber 15a, a seat surface 15c, and a distal end opening 15d in this order from a basal end. The housing 15 is attached to, for example, a distal end of an arm of the robot 6. As shown in FIG. 2, the housing 15 may have a rectangular parallelepiped outer shape. The cylinder chamber 15a is disposed around the cylinder axis 2. As shown in FIG. 1, the cylinder chamber 15a includes a cylinder portion 15a2 and a small-diameter guide portion 15a1. The cylinder portion 15a2 is disposed in a central portion of the housing 15. The small-diameter guide portion 15a1 has a diameter smaller than the cylinder portion 15a2. The small-diameter guide portion 15a1 is connected to the cylinder portion 15a2 and opens to the basal end of the housing 15. The seat surface 15c is disposed at a distal end portion of the housing 15. The seat surface 15c is a plane perpendicular to the cylinder axis 2. The seat surface 15c is connected to the cylinder chamber 15a via the rotation stopper 19. The distal end opening 15d opens from the seat surface 15c to the distal end of the housing 15. Preferably, the distal end opening 15d increases in diameter toward the distal end.

The housing 15 has a fluid-port 15f. The fluid-port 15f is connected to the cylinder portion 15a2. The fluid-port 15f is connected to the air source 8. The air source 8 supplies compressed air to the cylinder portion 15a2 via the fluid-port 15f.

The piston 21 has a hollow cylindrical shape. The piston 21 includes a head portion 21b, a sleeve 21a, a recess (action portion) 21d, a basal end opening 21c, a seal 21e, and a seal 21f. The head portion 21b, which is a hollow-cylinder, reciprocates in the cylinder portion 15a2. The recess 21d has a larger diameter toward the distal end. The recess 21d is, for example, a conical surface centered on the cylinder axis 2. The sleeve 21a is connected to the basal end of the head portion 21b. The sleeves 21a are guided to the small-diameter guide portion 15a1. The basal end opening 21c is an inner surface of the sleeve 21a. The basal end opening 21c may also be a conical surface with a larger diameter toward the basal end. The basal end opening 21c is connected to the recess 21d. The seal 21e is mounted on an outer cylindrical surface of the head portion 21b. The seal 21f is mounted on an outer cylindrical surface of the sleeve 21a.

The tilting body 17 is hollow cylindrical or spherical. The tilting body 17 has a convex spherical surface (centering portion) 17a, a head surface 17b, a sleeve 17c, and an insertion hole 17d. The convex spherical surface 17a is disposed at a basal end portion of the tilting body 17. The convex spherical surface 17a comes into contact with and slides on the recess 21d. The convex spherical surface 17a has a tilt center 17e. The tilt center 17e is the center of the convex spherical surface 17a. The tilt axis 3 passes through the tilt center 17e. The head surface 17b is located at a distal end portion of the tilting body 17. The head surface 17b is, for example, a flat surface. The head surface 17b, which is a flat surface, is perpendicular to the tilt axis 3. The sleeve 17c extends toward the distal end from the head surface 17b. The sleeve 17c is a hollow right cylinder. The insertion hole 17d is an inner surface of the sleeve 17c. The insertion hole 17d passes through the tilting body 17 around the tilt axis 3. The insertion hole 17d is a cylindrical hole.

The spindle body 11 is inserted into the insertion hole 17d. The spindle body 11 passes through the tool bracket 13. The spindle body 11 includes a body 11a, a spindle 11b, and a spindle motor 11c. The spindle 11b is rotatably supported on the body 11a about the tilt axis 3. A tip tool 1 is attached to the spindle 11b. The spindle motor 11c, which is disposed in the body 11a, is connected to the spindle 11b. For example, the spindle motor 11c rotates the spindle 11b in the rotational direction 5 (counterclockwise as viewed from the distal end).

The coupling 18 has a hollow cylindrical shape. The coupling 18 fastens the sleeve 17c to the spindle body 11. The coupling 18 is, for example, a rigid coupling.

Figure 3:
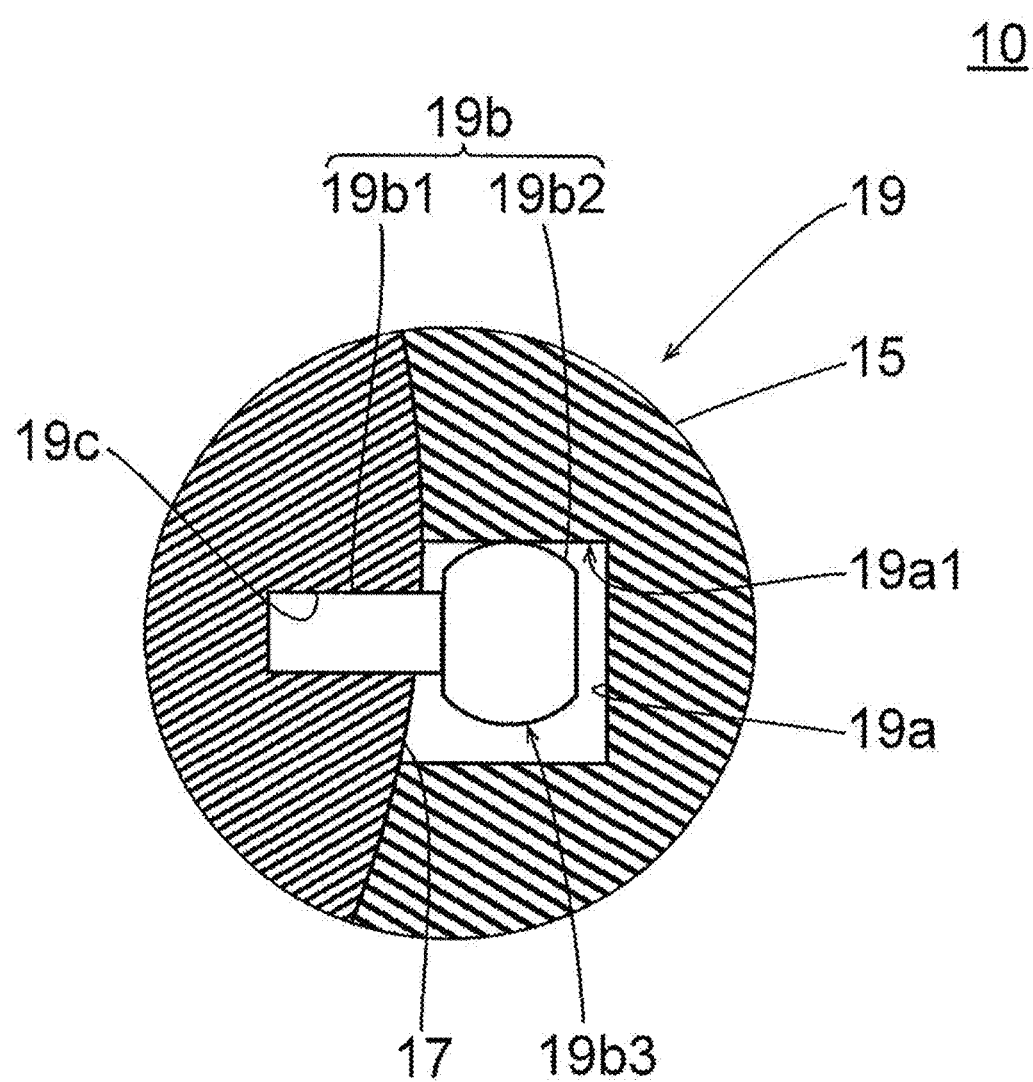
FIG. 3 is an enlarged view of part III in FIG. 2.

As shown in FIGS. 1 to 3, the rotation stopper 19 includes a plurality of receiving grooves 19a, a plurality of rotation stopper pin (rotation member) 19b, and a pin hole 19c.

The plurality of receiving grooves 19a are arranged rotationally symmetrically with respect to the cylinder axis 2 in the inner diameter portion of the housing 15. Each receiving groove 19a is a square groove extending parallel to the cylinder axis 2 and has a rectangular cross section. An abutment surface 19a1 is a side of the receiving groove 19a opposite to the rotational direction 5. The abutment surface 19a1 is a plane passing through the cylinder axis 2.

A plurality of the pin holes 19c are arranged on the tilting body 17. Each of the pin hole 19c extends through the tilt center 17e and parallel to the abutment surface 19a1 on a plane perpendicular to the tilt axis 3. The pin hole 19c is a cylindrical hole.

The rotation stopper 19 has the same number of rotation stopper pins 19b as the receiving grooves 19a. The plurality of rotation stopper pins 19b are arranged rotationally symmetrically with respect to the tilt axis 3. The rotation stopper pin 19b includes a shaft 19b1 and a bulging portion 19b2. The shaft 19b1 is inserted into the pin hole 19c. The bulging portion 19b2 protrudes radially from the tilting body 17. A play (gap) is provided between the bulging portion 19b2 and the receiving groove 19a. Preferably, the rotation stopper pin 19b has an abutting spherical surface 19b3.

The basal end cover 27 covers between the basal end surface of the housing 15 and the spindle body 11. The basal end cover 27 prevents foreign matter, cutting coolant, or the like from entering between the cylinder chamber 15a, the basal end opening 21c, and the spindle body 11.

The distal end cover 25 covers between the distal end surface of the housing 15 and the spindle body 11 or the coupling 18. The distal end cover 25 prevents foreign matter, cutting coolant, or the like from entering between the spindle body 11 and the distal end opening 15d.

Figure 4:
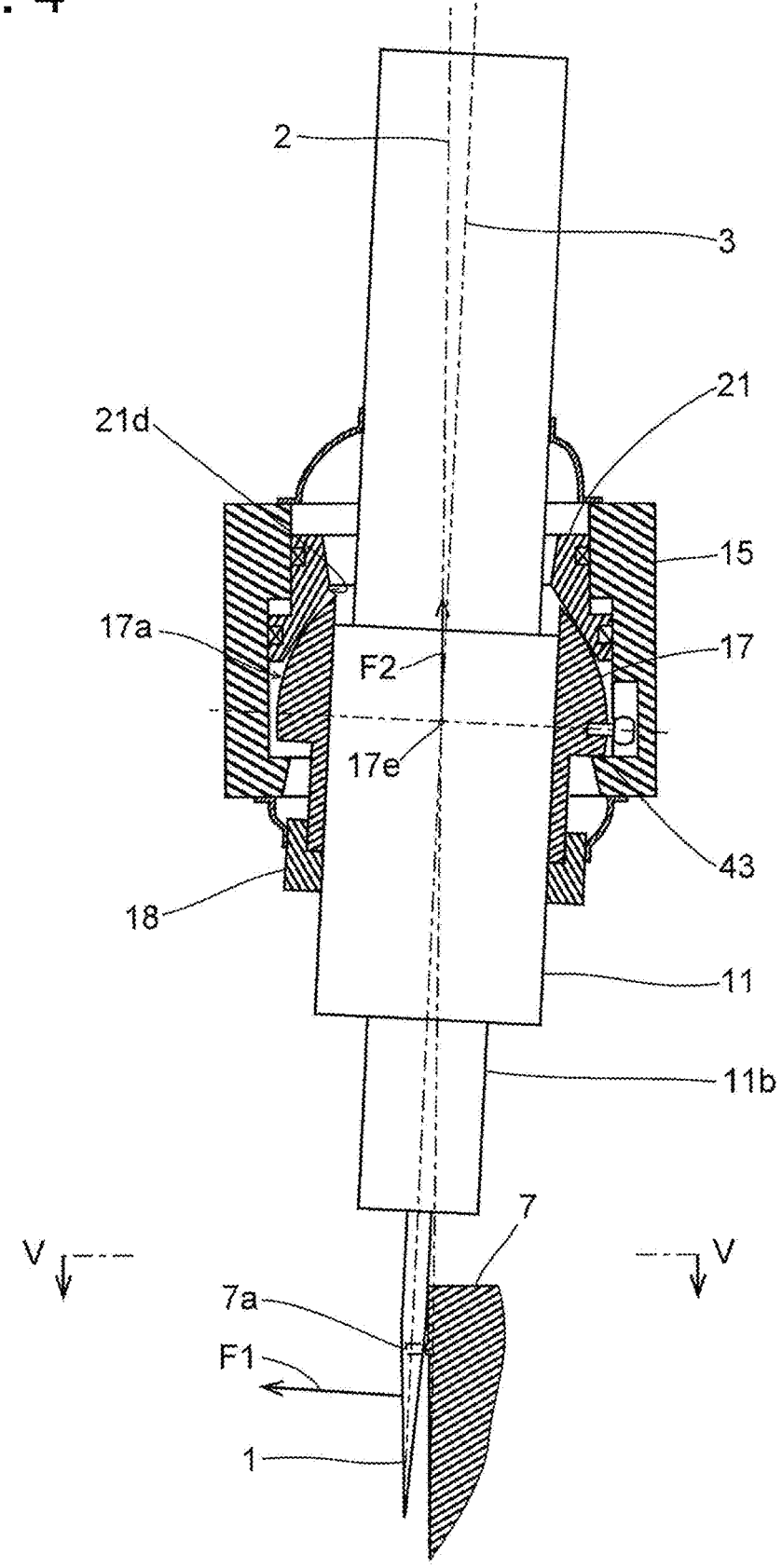
FIG. 4 is a longitudinal sectional view of the deburring tool according to the first embodiment in a tilted state.
Figure 5:
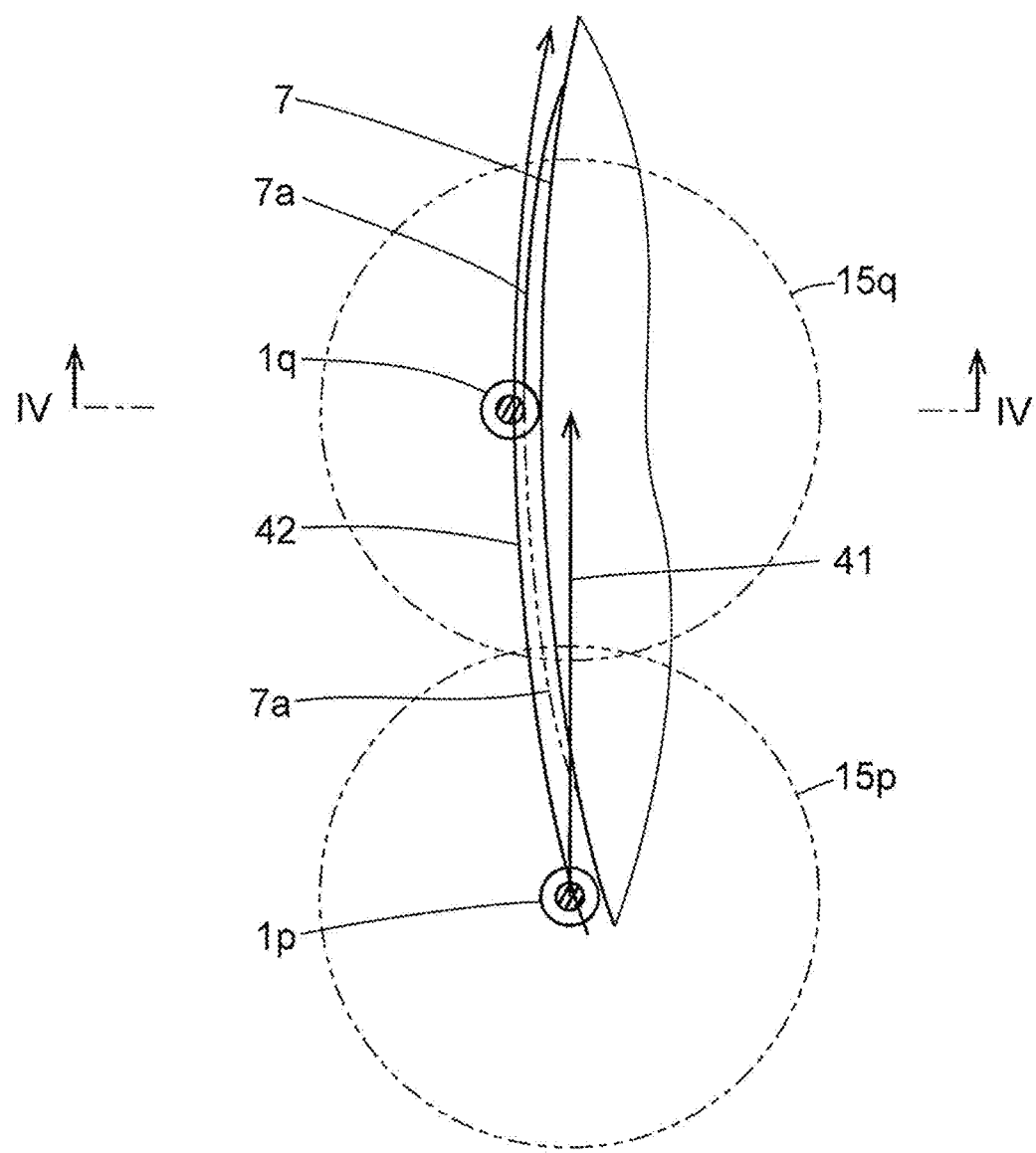
FIG. 5 is a cross-sectional view taken along line V-V in FIG. 4.

Referring to FIGS. 1 to 5, the use state of the deburring tool 10 will be described. FIGS. 4 and 5 show a situation in which the deburring tool 10 performs deburring of the workpiece 7. FIG. 4 is a sectional view taken along line IV-IV in FIG. 5. As shown in FIGS. 4 and 5, the workpiece 7 has a burr 7a. Here, the two-dot chain line of the burr 7a in FIG. 5 indicates a shape of the dropped part. The side surface of the workpiece 7 has a curved surface that is convex toward the deburring tool 10 as viewed from the basal end along the cylinder axis 2. The burr 7a protrudes from the side surface of the workpiece 7. The spindle 11b rotates in the rotational direction 5. The air source 8 supplies compressed air to the cylinder chamber 15a.

As shown in FIG. 1, when the tip tool 1 is separated from the workpiece 7, the tip tool 1 does not receive a large moment load F1 (see FIG. 4). The piston 21 is moved to the distal end by the compressed air supplied to the cylinder chamber 15a. At this time, the head surface 17b abuts against the seat surface 15c. This suppresses tilting of the spindle body 11. The tilt axis 3 substantially coincides with the cylinder axis 2. At this time, as the head surface 17b and the seat surface 15c are flat surfaces, the tilt axis 3 is easily stabilized.

When the spindle 11b starts to rotate, the spindle body 11 also attempts to rotate. As shown in FIG. 3, the bulging portion 19b2 of the rotation stopper pin 19b abuts on the abutment surface 19a1 of the receiving groove 19a to prevent the spindle body 11 from rotating.

Next, the tip tool 1 is brought into contact with the workpiece 7 to perform deburring. As shown in FIG. 5, the robot 6 moves the housing 15 along a linear trajectory 41 from a position 15p toward a position 15q. Then, as shown in FIGS. 4 and 5, while the spindle body 11 is tilted, the tip tool 1 moves from a position 1p to a position 1q by drawing a trajectory 42 so as to trace the shape of the side surface of the workpiece 7. The tip tool 1 scrapes off the burr 7a.

As shown in FIG. 4, when a moment load F1 acts on the tip tool 1, the tilting body 17 and the spindle body 11 are inclined integrally with one point 43 around the head surface 17b as a center. Then, while the convex spherical surface 17a is in contact with the recess 21d, the piston 21 is pushed upward toward the basal end. At this time, the tilting body 17 is tilted while the convex spherical surface 17a slides in the recess 21d. The tilt center 17e moves along the cylinder axis 2 toward the basal end. The recess 21d has a circular cross section centered on the cylinder axis 2. The convex spherical surface 17a and the recess 21d are thus substantially in contact with each other around the entire circumference. The tilting body 17 pushes up the piston 21 along the cylinder axis 2 with the tilt center 17e at an action point. In other words, the urging force F2 applied by the tilting body 17 to the piston 21 has the cylinder axis 2 as an action line. The air is compressible fluid. The piston 21 can thus move toward the basal end against the pressure of the compressed air supplied to the piston chamber. As the piston 21 receives the urging force F2 along the cylinder axis 2, the inclination of the piston 21 is suppressed. The piston 21 can thus smoothly move along the cylinder axis 2. The piston 21 urges the tilting body 17 toward the distal end by the pressure of the compressed air. The tilting body 17 thus remains in contact with the seat surface 15c.

When the tilt axis 3 tilts from the cylinder axis 2, the bulging portion 19b2 and the receiving groove 19a come into contact with each other while being twisted. According to the present embodiment, as the abutting spherical surface 19b3 is in point contact with the abutting surface 19a1, the contact resistivity between the bulging portion 19b2 and the receiving groove 19a is small. The tilting body 17 is thus easily tilted smoothly.

The operator teaches the robot 6 to determine the trajectory 41 and the speed of the deburring tool 10. Preferably, the teaching of the robot 6 is carried out with the tilt axis 3 substantially coinciding with the cylinder axis 2. As described above, the head surface 17b abuts against the seat surface 15c to easily stabilize the posture of the spindle body 11. The operator can thus easily teach the robot 6. Further, as the posture of the tilt axis 3 is stable when the robot 6 moves the deburring tool 10, contact of the deburring tool 10 with the workpiece 7, the safety fence, and the worker is suppressed.

Second Embodiment

Figure 6:
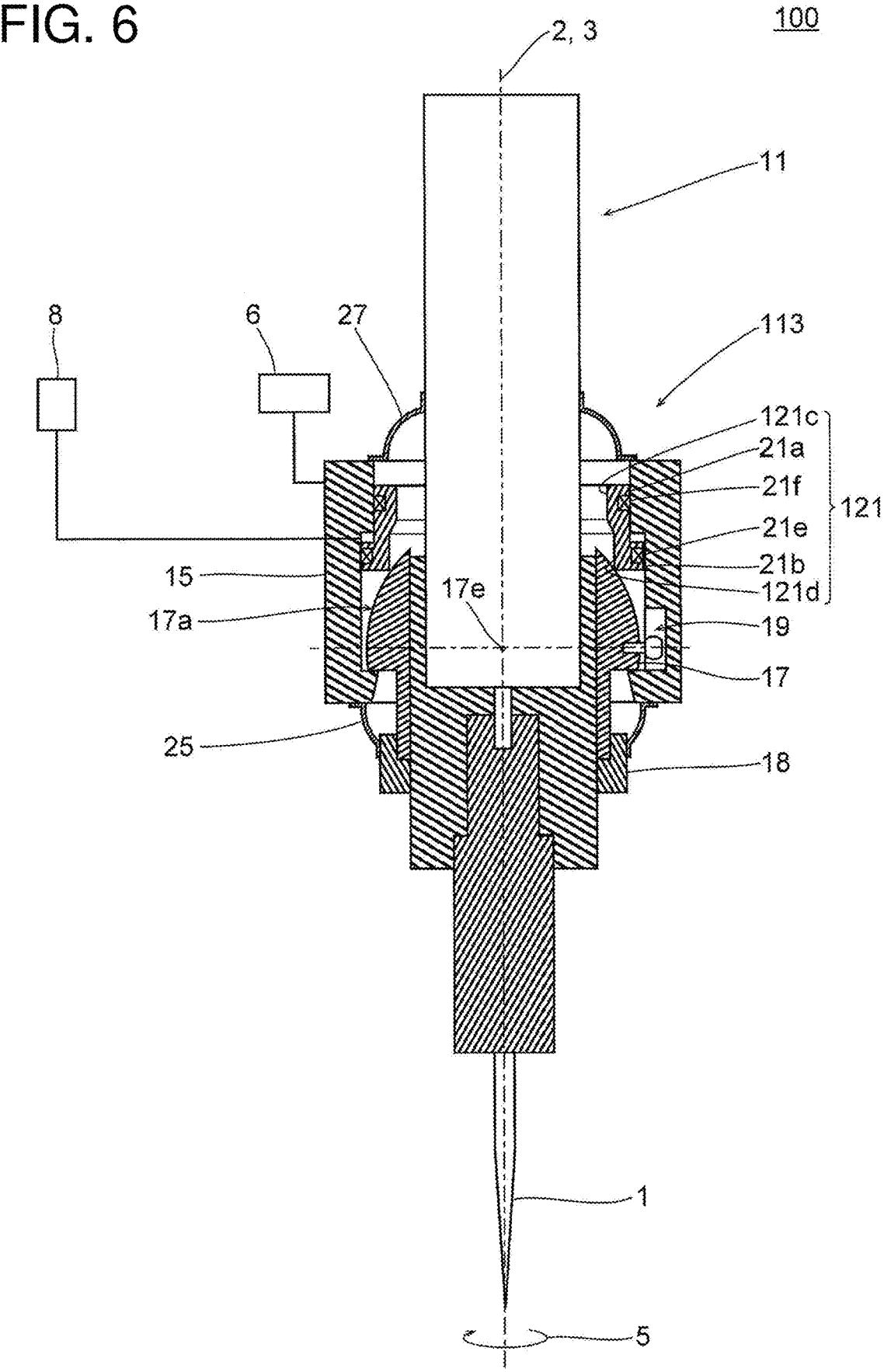
FIG. 6 is a longitudinal sectional view of a deburring tool according to a second embodiment.

As shown in FIG. 6, a deburring tool 100 according to the present embodiment includes a tool bracket 113 and a spindle body 11. The tool bracket 113 includes a piston 121 instead of the piston 21 of the first embodiment. Other configurations of the tool bracket 113 are substantially the same as the tool bracket 13 of the first embodiment.

The piston 121 includes a sleeve 21a, a head portion 21b, a basal end opening 121c, a recess (action portion) 121d, a seal 21e, and a seal 21f. The basal end opening 121c is connected to the recess 121d. The basal end opening 121c and the recess 121d are cylindrical holes centered on the cylinder axis 2. The inner diameters of the basal end opening 121c and the recess 121d may be the same.

When the tilting body 17 is tilted, the convex spherical surface 17a contacts the opening at substantially entire periphery of the basal end of the recess 121d. At this time, the convex spherical surface 17a urges the recess 121d with the cylinder axis 2 as an action line. The tilting body 17 pushes the piston 121 upward toward the basal end.

Third Embodiment

Figure 7:
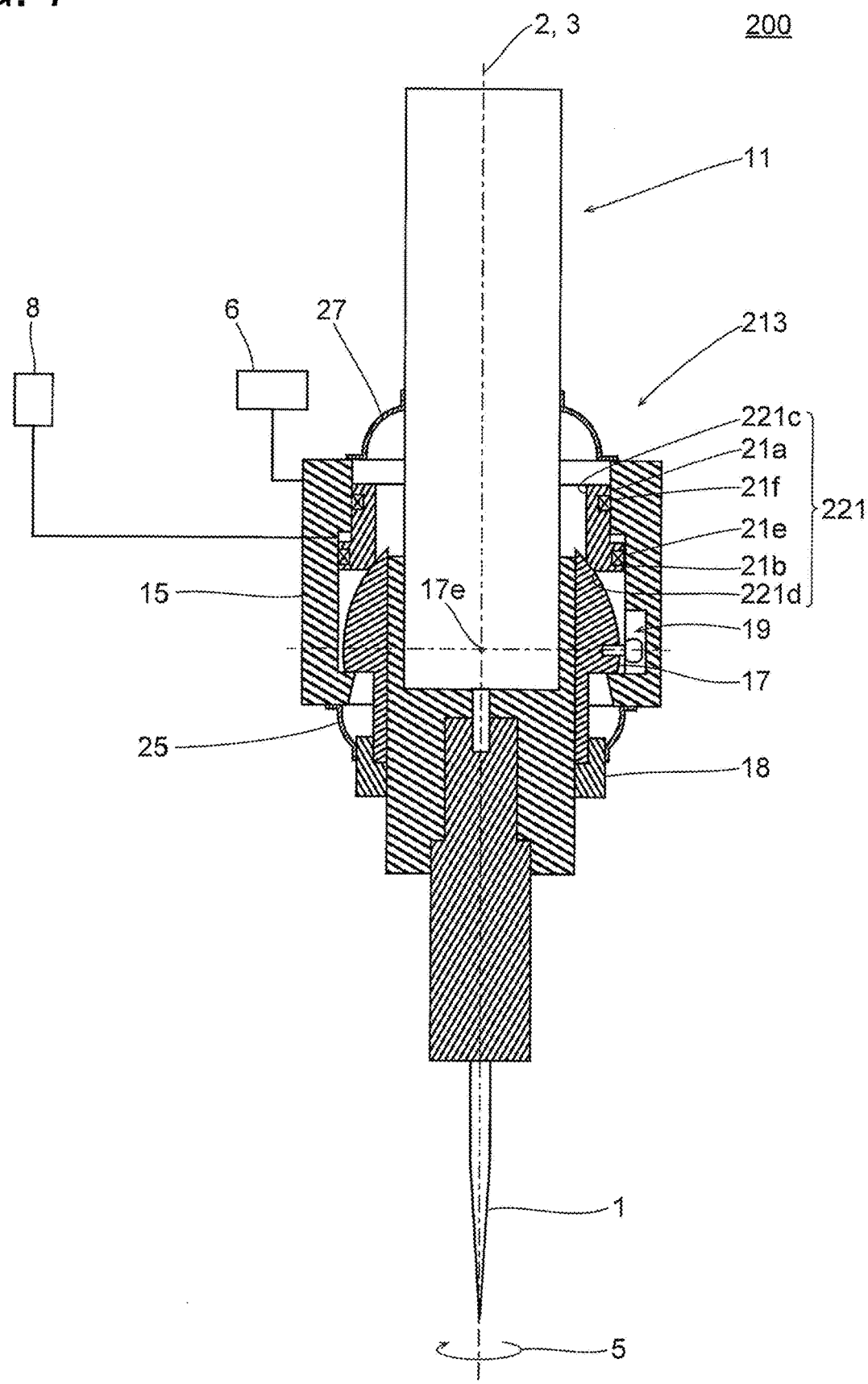
FIG. 7 is a longitudinal sectional view of a deburring tool according to a third embodiment.

As shown in FIG. 7, a deburring tool 200 according to the present embodiment includes a tool bracket 213 and a spindle body 11. The tool bracket 213 includes a piston 221 instead of the piston 21 of the first embodiment. Other configurations of the tool bracket 213 are substantially the same as the tool bracket 13 of the first embodiment.

The piston 221 includes a sleeve 21a, a head portion 21b, a basal end opening 221c, a recess (action portion) 221d, a seal 21e, and a seal 21f. The piston 221 has a rounded shape at the inner edge of the lower end portion of the piston 21 of the second embodiment. In other words, the inner surface of the lower end of the piston 221 is a troid shape formed from a quarter circle about the cylinder axis 2. The inner surface of the lower end of the piston 221 may be said to be ring donut-shaped. The longitudinal section of the lower end portion of the piston 221 is an inward arc convex.

When the tilting body 17 is tilted, substantially entire periphery of the convex spherical surface 17a contacts the recess 221d. At this time, the convex spherical surface 17a urges the recess 221d with the cylinder axis 2 as an action line. The tilting body 17 pushes the piston 221 upward toward the basal end. As the recess 221d is rounded, the convex spherical surface 17a is prevented from being damaged.

Fourth Embodiment

Figure 8:
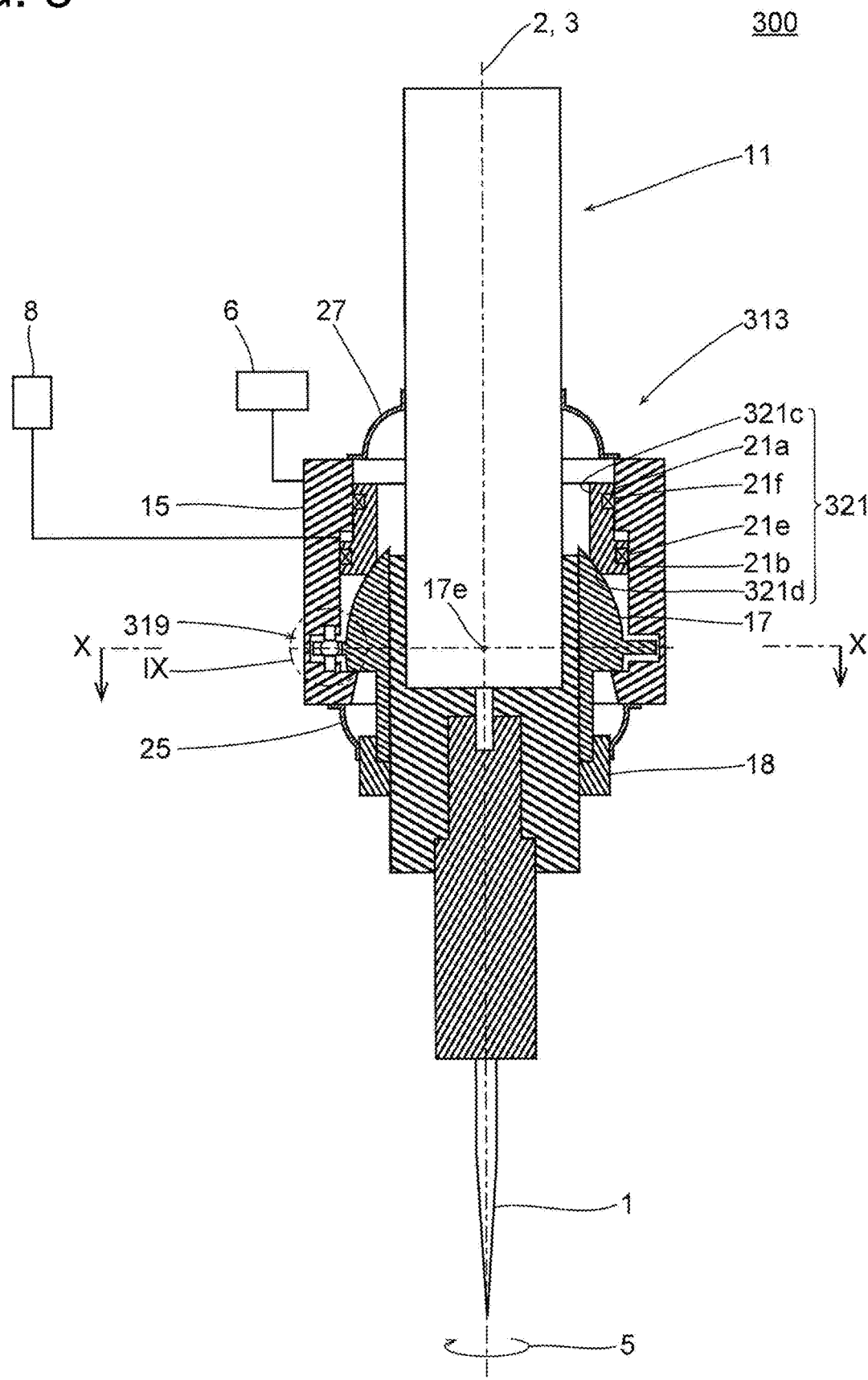
FIG. 8 is a longitudinal sectional view of a deburring tool according to a fourth embodiment.

As shown in FIG. 8, a deburring tool 300 according to the present embodiment includes a tool bracket 313 and a spindle body 11. The tool bracket 313 includes a piston 321 instead of the piston 21 of the first embodiment. In addition, the tool bracket 313 includes a rotation stopper 319 instead of the rotation stopper 19 of the first embodiment. Other configurations of the tool bracket 313 are substantially the same as the tool bracket 13 of the first embodiment.

The piston 321 includes a sleeve 21a, a head portion 21b, a basal end opening 321c, a recess (action portion) 321d, a seal 21e, and a seal 21f. The recess 321d is a concave spherical surface having the same diameter as the convex spherical surface 17a with the tilt center 17e as the center. Other configurations of the piston 321 are substantially the same as those of the piston 221 of the third embodiment.

Figure 9:
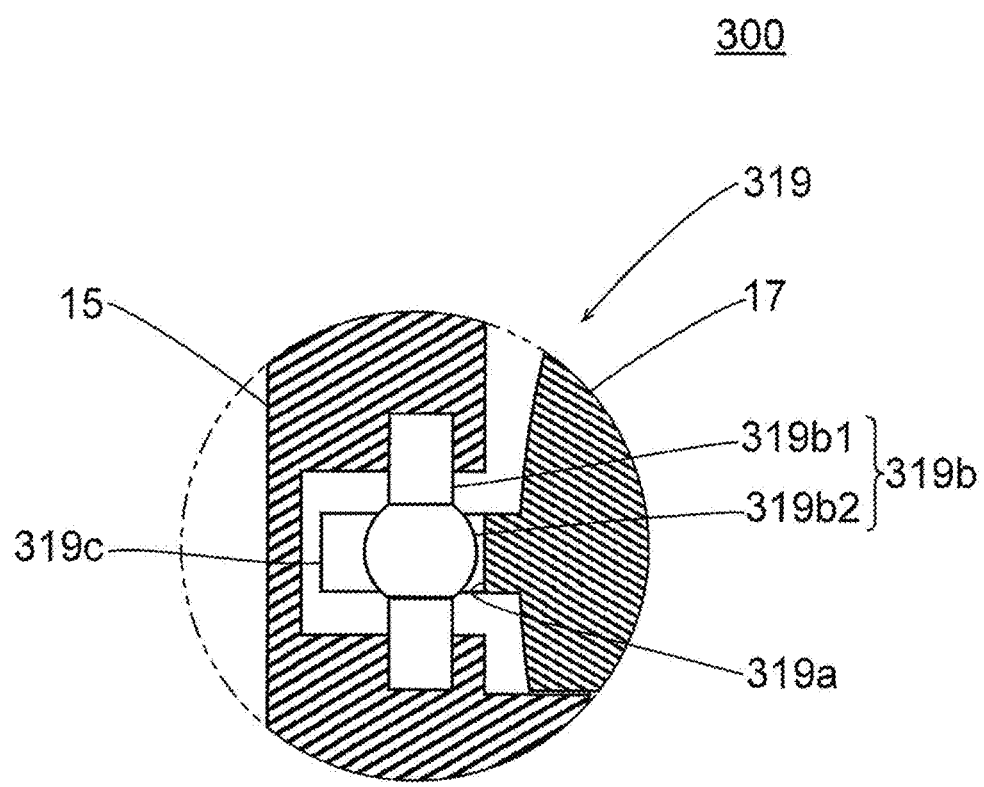
FIG. 9 is an enlarged view of part IX in FIG. 8.
Figure 10:
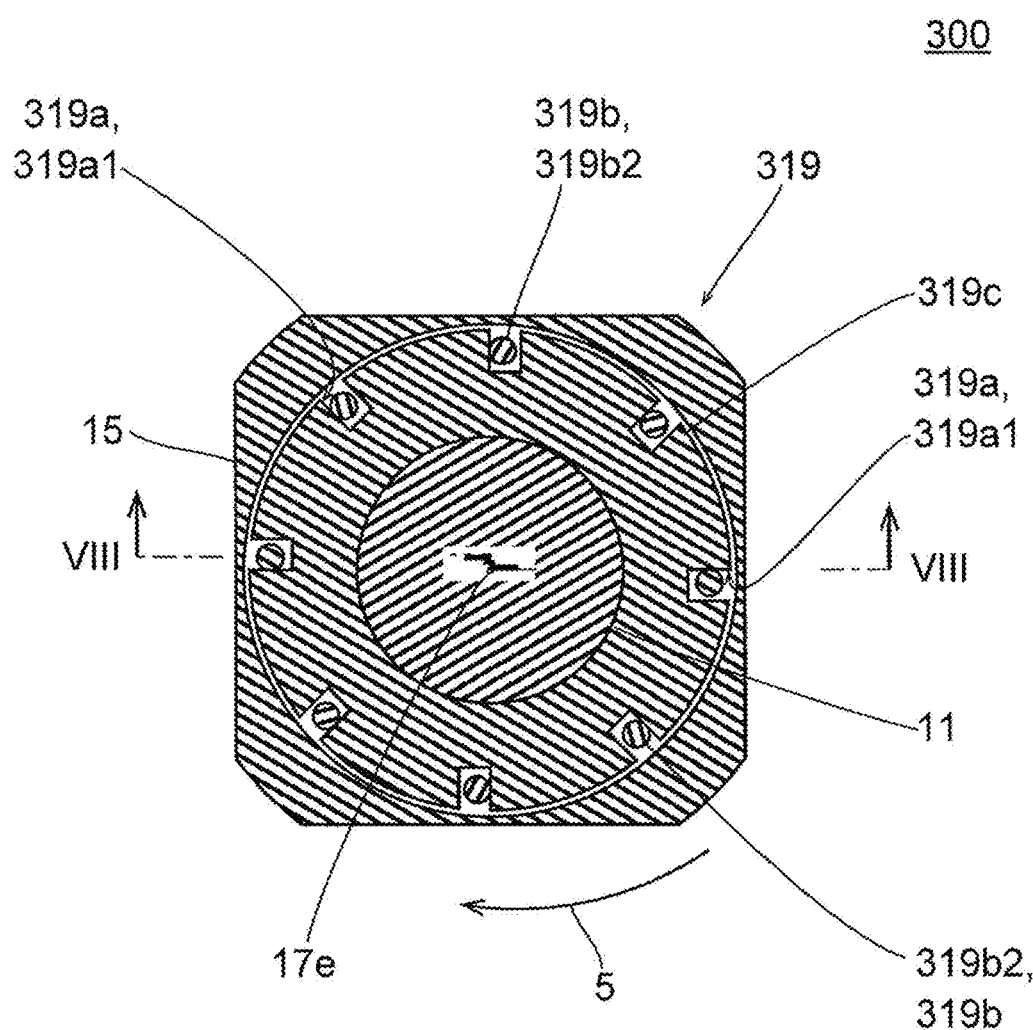
FIG. 10 is a cross-sectional view taken along line X-X in FIG. 8.

As shown in FIGS. 9 and 10, the rotation stopper 319 includes a flange 319c and a rotation stopper pin 319b.

The flange 319c may be integrally formed with the tilting body 17. The flange 319c passes through the tilt center 17e and extends perpendicularly to the tilt axis 3. The flange 319c has a plurality (in this embodiment, eight) of receiving grooves (receiving portions) 319a. The receiving groove 319a is a cutout extending radially inward from the outer periphery of the flange 319c. The receiving groove 319a has an abutment surface 319a1. The abutment surface 319a1 is a plane passing through the tilt axis 3. The plurality of receiving grooves 319a are arranged symmetrically about the tilt axis 3. The receiving groove 319a may be a rectangular through-hole in plan view.

The rotation stopper pin 319b, which extends parallel to the cylinder axis 2, is disposed at a distal end portion of the housing 15. The rotation stopper pin 319b passes through the receiving groove 319a. The rotation stopper pin 319b has a bulging portion 319b2. The bulging portion 319b2 is, for example, spherical or ellipsoidal. Preferably, the rotation stopper pin 319b is supported on the housings 15 at both sides of the bulging portion 319b2. The bulging portion 319b2 is disposed within the receiving groove 319a. The bulging portion 319b2 and the receiving groove 319a have a play. As the spindle 11b rotates, the bulging portion 319b2 abuts against the abutment surface 319a1. The bulging portion 319b2 contacts the abutment surface 319a1 at a point.

When the tilting body 17 is tilted, substantially entire surface of the convex spherical surface 17a contacts the recess 321d. At this time, the convex spherical surface 17a urges the recess 321d with the cylinder axis 2 as an action line. The tilting body 17 pushes the piston 321 upward toward the basal end. The convex spherical surface 17a and the recess 321d are in surface-contact and thus promote the tilt center 17e to move along the cylinder axis 2.

Fifth Embodiment

Figure 11:
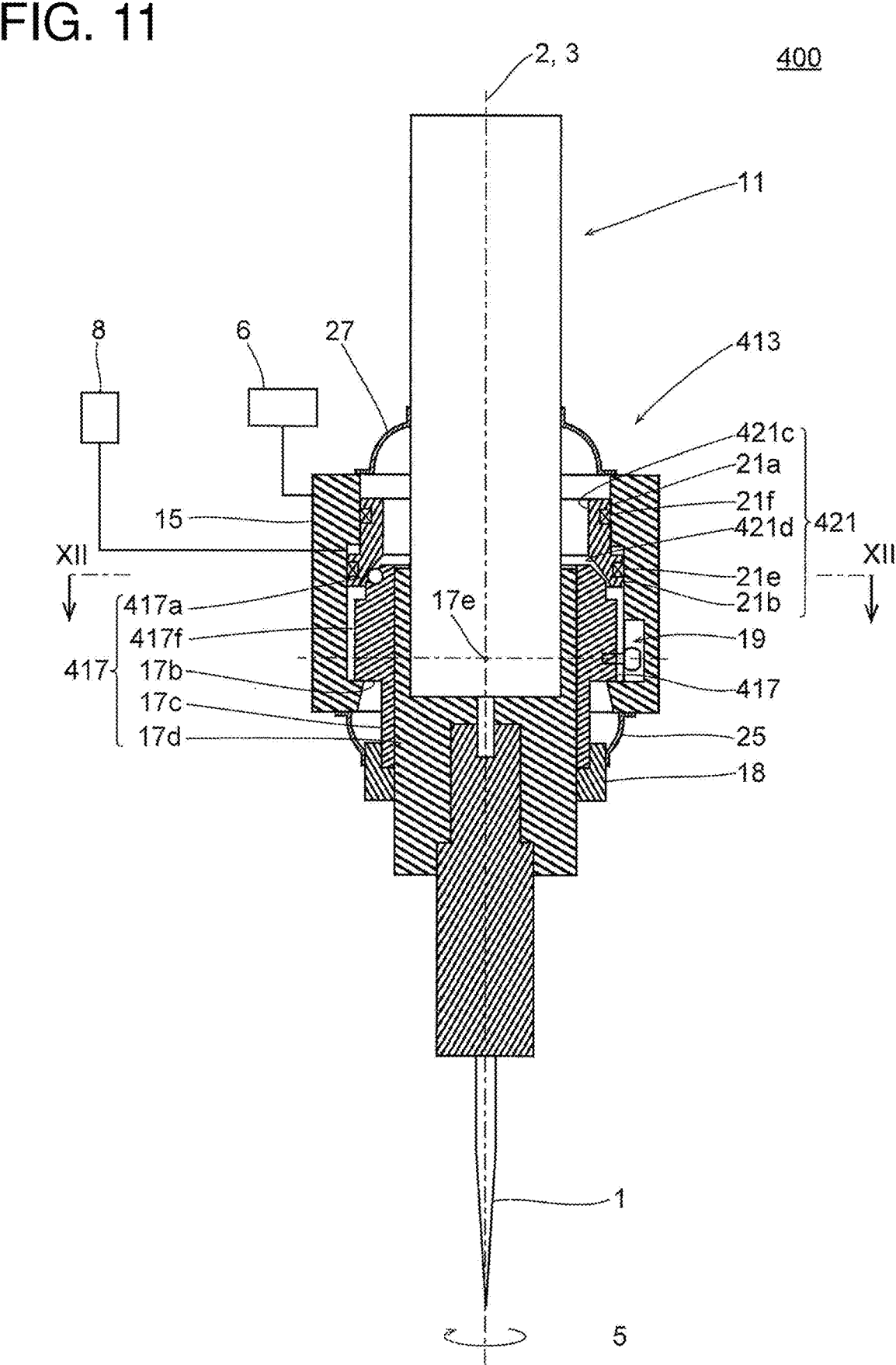
FIG. 11 is a longitudinal sectional view of a deburring tool according to a fifth embodiment.
Figure 12:
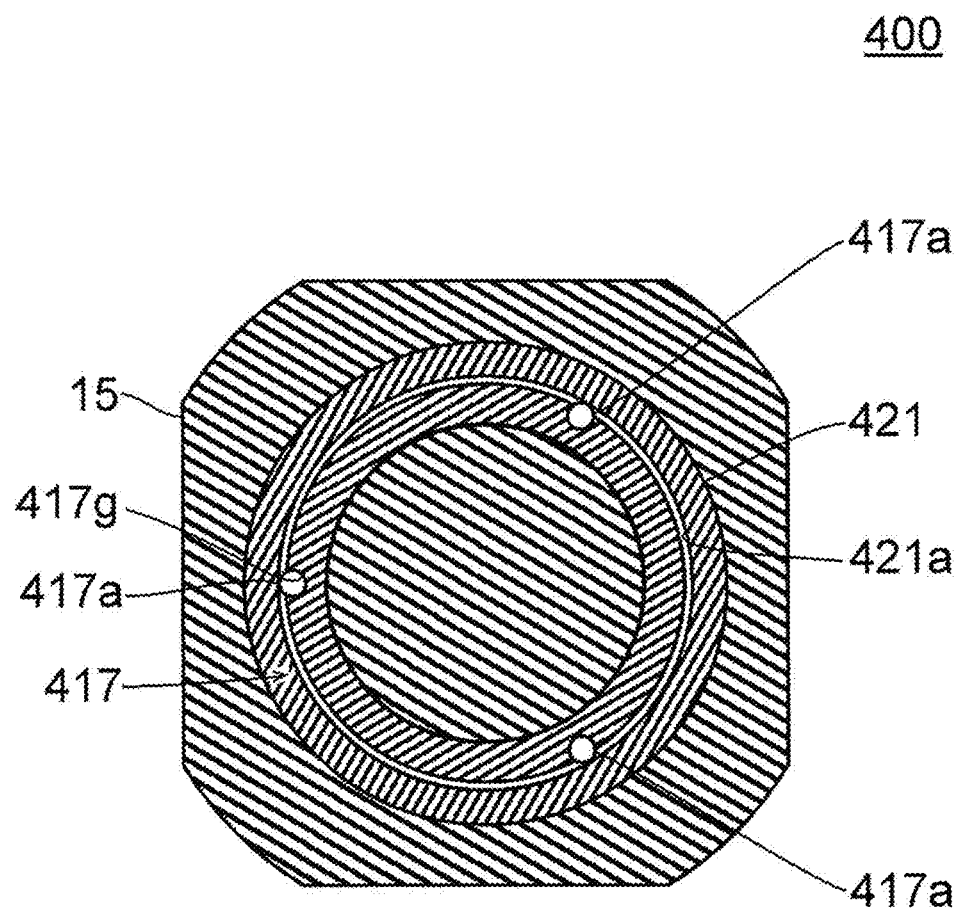
FIG. 12 is a cross-sectional view taken along line XII-XII in FIG. 11.

As shown in FIGS. 11 and 12, a deburring tool 400 according to the present embodiment includes a tool bracket 413 and a spindle body 11. The tool bracket 413 includes a piston 421 instead of the piston 21 of the first embodiment. The tool bracket 413 includes a tilting body 417 instead of the tilting body 17 of the first embodiment. Other configurations of the tool bracket 413 are substantially the same as the tool bracket 13 of the first embodiment.

The piston 421 includes a sleeve 21a, a head portion 21b, a basal end opening 421c, a recess (action portion) 421d, a seal 21e, and a seal 21f. The basal end opening 421c is a cylinder centered on the cylinder axis 2. The basal end opening 421c is connected to the recess 421d. The recess 421d is a concave spherical surface centered on the tilt center 17e. The tilt center 17e is on the cylinder axis 2.

The tilting body 417 includes a body 417f, a ball (contact protrusion) 417a, a head surface 17b, and a sleeve 17c. The body 417f is hollow right cylindrical. The basal end of the body 417f may be frustoconical. The body 417f has a plurality (n) of ball support holes 417g. Here, n is an integer of 3 or more (n=3 in the present embodiment). The ball support hole 417g is spherical. The ball support holes 417g are arranged n-times symmetrically about the tilt axis 3.

The balls 417a are respectively arranged in the ball support hole 417g. The ball 417a rolls on the recess 421d. The ball 417a contacts the recess 421d and rolls on the recess 421d which is a spherical surface. The tilting body 417 can thus tilt about the tilt center 17e with respect to the piston 421.

For example, n may be 7 to 10. At this time, the ball support hole may be continuous in an annular shape. At this time, the tilting body 417 may include a ball retainer for holding the ball 417a at regular intervals.

Instead of the ball support hole 417g and the ball 417a, a pin having a sphere at a distal end may be used. The pin is fastened to the tilting body 417.

The ball 417a contacts the recess 321d at n points. When the tilting body 417 is tilted, the ball 417a urges the recess 421d with the cylinder axis 2 as an action line. The tilting body 17 pushes the piston 421 upward toward the basal end. The ball 417a and the recess 421d come into point-contact and the ball 417a rolls. The tilt center 17e is thus promoted to move along the cylinder axis 2.

The present invention is not limited to the above-described embodiments, and various modifications can be made without departing from the gist of the present invention, and all technical matters included in the technical idea described in the claims are the subject of the present invention. While the above embodiments have been shown by way of example, those skilled in the art will recognize that various alternatives, modifications, variations, and improvements can be made from the disclosure herein, which fall within the scope of the appended claims.

REFERENCE SIGNS LIST

1 Tip tool
2 Piston axis
3 Tilt axis
7 Workpiece
13, 113, 213, 313, 413 Tool bracket
15 Housing
15c Seat surface
15f Fluid-port
17, 117, 217, 317, 417 Tilting body
17a, 117a, 217a, 317a, 417a Centering section
17b Head surface
21, 121, 221, 321, 421 Piston
21d, 121d, 221d, 321d, 421d Action portion

What is claimed is:
1. A tool bracket, comprising:
a housing including a cylinder chamber extending along a cylinder axis;

a piston configured to be urged by compressible fluid toward distal end to reciprocate in the cylinder chamber, the piston having an action portion disposed at a distal end of the piston; and a tilting body having a tilt axis, the tilting body disposed in the cylinder chamber in a tiltable manner with respect to the cylinder axis, the tilting body including a centering portion disposed at basal end to abut the action portion, the centering portion configured to press the piston with the cylinder axis as an action line when the tilt axis is tilted from the cylinder axis.

2. The tool bracket according to claim 1, wherein the centering portion has a convex spherical surface.

3. The tool bracket according to claim 1, wherein the action portion is a recess having a circular cross-section.

4. The tool bracket according to claim 1, wherein the centering portion includes a plurality of contact protrusions arranged n-times symmetrically about the tilt axis, n is an integer of 3 or more, and the action portion is a concave spherical surface having a center on the cylinder axis.

5. The tool bracket according to claim 1, wherein the housing includes a seat surface disposed at distal end, the tilting body includes a head surface disposed at distal end, the head surface abuts against the seat surface when the tilt axis is substantially aligned with the cylinder axis.

6. The tool bracket according to claim 1, wherein the seat surface is a flat plane perpendicular to the cylinder axis, and the head surface is a flat plane perpendicular to the tilt axis.

7. The tool bracket according to claim 1, wherein a spindle body is attached to the tilting body, a rotatable tip tool is attachable to the spindle body, the tool bracket further comprises:

a rotation stopper disposed between the tilting body and the housing to prevent the tilting body from rotating about the cylinder axis.

8. The tool bracket according to claim 7, wherein the rotation stopper is disposed in the cylinder chamber near the distal end.

9. A deburring tool, comprising:

the tool bracket according to claim 1, and a spindle body to which a rotatable tip tool is attachable, the spindle body disposed on the tilting body to be tilted integrally with the tilting body.

10. The tool bracket according to claim 2, wherein the action portion is a recess having a circular cross-section.

11. The tool bracket according to claim 3, wherein the centering portion includes a plurality of contact protrusions arranged n-times symmetrically about the tilt axis, n is an integer of 3 or more, and the action portion is a concave spherical surface having a center on the cylinder axis.

12. The tool bracket according to claim 2, wherein the housing includes a seat surface disposed at distal end, the tilting body includes a head surface disposed at distal end, the head surface abuts against the seat surface when the tilt axis is substantially aligned with the cylinder axis.

13. The tool bracket according to claim 3, wherein the housing includes a seat surface disposed at distal end, the tilting body includes a head surface disposed at distal end, the head surface abuts against the seat surface when the tilt axis is substantially aligned with the cylinder axis.

14. The tool bracket according to claim 4, wherein the housing includes a seat surface disposed at distal end, the tilting body includes a head surface disposed at distal end, the head surface abuts against the seat surface when the tilt axis is substantially aligned with the cylinder axis.

15. The tool bracket according to claim 2, wherein the seat surface is a flat plane perpendicular to the cylinder axis, and the head surface is a flat plane perpendicular to the tilt axis.

16. The tool bracket according to claim 3, wherein the seat surface is a flat plane perpendicular to the cylinder axis, and the head surface is a flat plane perpendicular to the tilt axis.

17. The tool bracket according to claim 4, wherein the seat surface is a flat plane perpendicular to the cylinder axis, and the head surface is a flat plane perpendicular to the tilt axis.

18. The tool bracket according to claim 5, wherein the seat surface is a flat plane perpendicular to the cylinder axis, and the head surface is a flat plane perpendicular to the tilt axis.

* * * * *